United States Patent [19]
Tabata et al.

[11] Patent Number: 5,993,764
[45] Date of Patent: *Nov. 30, 1999

[54] NITROGEN OXIDE-REDUCING CATALYST AND PROCESS FOR REDUCING NITROGEN OXIDES IN EXHAUST GAS

[75] Inventors: Takeshi Tabata; Mikako Kokitsu; Osamu Okada, all of Osaka; Hirofumi Ohtsuka, Hyogo, all of Japan; Giuseppe Bellussi, Piacenza; Luigina Maria Flora Sabatino, San Donato Milanese, both of Italy

[73] Assignees: Osaka Gas Company Limited, Osaka, Japan; Eniricerche S.p.A., San Donato Milanese, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/765,151

[22] PCT Filed: Apr. 10, 1996

[86] PCT No.: PCT/JP96/00978

§ 371 Date: Dec. 11, 1996

§ 102(e) Date: Dec. 11, 1996

[87] PCT Pub. No.: WO96/33004

PCT Pub. Date: Oct. 24, 1996

[30] Foreign Application Priority Data

Apr. 17, 1995 [JP] Japan .................................. 7-116412
Apr. 19, 1995 [JP] Japan .................................. 7-119114

[51] Int. Cl.$^6$ ................................................ B01D 53/56
[52] U.S. Cl. ...................... 423/239.2; 423/213.5; 502/60; 502/64; 502/66; 502/73; 502/74
[58] Field of Search ............................. 423/239.2, 213.5; 502/60, 64, 66, 73, 74

[56] References Cited

U.S. PATENT DOCUMENTS

| | | |
|---|---|---|
| 3,308,069 | 3/1967 | Wadlinger et al. . |
| 4,491,637 | 1/1985 | Hartig et al. . |
| 4,867,954 | 9/1989 | Staniulis et al. ........................ 423/239 |
| 5,149,512 | 9/1992 | Li et al. .................................. 423/239 |
| 5,260,043 | 11/1993 | Li et al. . |
| 5,443,803 | 8/1995 | Mizuno et al. . |
| 5,451,385 | 9/1995 | Hansel et al. ........................ 423/213.5 |

FOREIGN PATENT DOCUMENTS

| | | |
|---|---|---|
| 0 603 900 | 6/1991 | European Pat. Off. . |
| 0 541 008 | 5/1993 | European Pat. Off. . |
| 0 541 008 A1 | 5/1993 | European Pat. Off. . |
| 0 603 900 | 6/1994 | European Pat. Off. ............ 423/239.2 |
| 0 652 040 | 5/1995 | European Pat. Off. . |
| 0 732 140 | 9/1996 | European Pat. Off. . |
| 0 739 651 | 10/1996 | European Pat. Off. . |
| MI93A2337 | 11/1993 | Italy . |
| 63-100919 | 5/1988 | Japan . |
| 63-283727 | 11/1988 | Japan . |
| 4-260441 | 9/1992 | Japan .................................. 423/239.2 |
| 5-220403 | 8/1993 | Japan . |
| 6-210171 | 8/1994 | Japan . |
| 2 238 784 | 6/1991 | United Kingdom . |
| WO 94/01365 | 1/1994 | WIPO . |

OTHER PUBLICATIONS

Catalytic reduction of nitrogen oxides with methane in the presence of excess oxygen: a review, J.N. Armor, Catalysis Today 26 (1995) 147–158.

The effect of $SO_2$ on the catalytic performance of Co–ZSM–5 and Co–ferrierite for the selective reduction of NO by $CH_4$ in the presence of $O_2$, Yuejin Li, John N. Armor, Applied Catalysis B: Envirnomental 5 (1995), L257–270, Air Products and Chemicals Inc.

Zeolite Molecular Sieves, Structures of Zeolites, pp 52–67.

Atlas of Zeolite Structure Types, W.M. Meier and D.H. Olson, 1992, pp450–469.

Selective Catalytic Reduction of Nitrogen Monoxide by Hydrocarbons in Oxidizing Atmosphere, YU–U et al., 67th CATSJ Meeting Abstracts: No. A2, vol. 33 1991.

Armor et al. "Catalytic Reduction of Nitrogen Oxides . . . " Applied Catalysis B: Environ. vol. 1, No. 4, L31–L40, Dec. 15, 1992.

Li, et al., "Catalytic reduction of nitrogen oxides with methane in the presence of excess oxygen", *Applied Catalysis B: Environmental*, 1 (1992) Amsterdam, pp. L31–L40.

*Primary Examiner*—Thomas Dunn
*Attorney, Agent, or Firm*—Merchant & Gould P.C.

[57] ABSTRACT

The present invention provides a NOx reducing catalyst comprising BEA zeolite which is ion-exchanged with Co to have a Co/Al ratio between 0.2 and 0.6 and is loaded with at least one metal selected from among Ca, Sr, Ba, La, Mn, Ag, In, and Ni. The present invention also provides a NOx reduction process comprising the use of the catalyst of the present invention. The catalyst of this invention provides high activity, high NOx reduction selectivity and durability at low temperature in an actual exhaust gas containing water vapor and other substances disturbing catalytic activity even at low temperature and at low NOx and hydrocarbon concentration.

18 Claims, 2 Drawing Sheets

NITROGEN OXIDE-REDUCING CATALYST AND PROCESS FOR REDUCING NITROGEN OXIDES IN EXHAUST GAS

TECHNICAL FIELD

The present invention relates to a catalyst for reducing nitrogen oxides in exhaust gas, more particularly to a catalyst for reducing nitrogen oxides by hydrocarbons in oxygen-rich exhaust gas, and to a process for reducing nitrogen oxides in exhaust gas, more particularly in exhaust gas containing hydrocarbons and an excessive amount of oxygen.

BACKGROUND ART

As a process for removing nitrogen oxides (hereinafter referred to as NOx) from oxygen-rich exhaust gas, ammonia denitration has been put into practical use. However, this process cannot be applied to small combustors because of two reasons: firstly it requires an ammonia source, and secondly release of excess ammonia can cause a secondary environmental pollution problem. It has been found recently, as is disclosed in Japanese Patent Laid Open Sho 63-100919, that NOx can selectively be reduced by hydrocarbons on a zeolite catalyst ion-exchanged with Cu or the like metal.

However, when hydrocarbons as the reducing agent have four or fewer carbons, this catalyst provides low selectivity (molar ratio of hydrocarbons used in NOx reduction to consumed hydrocarbons), and therefore low NOx conversion, in the presence of water vapor which is always contained in general exhaust gases.

Armor et al. reported (in Applied Catalysis B: Environmental, Vol. 1, p. L31) that NOx can selectively be reduced by methane on Co ion-exchanged ZSM-5 (MFI zeolite). However, it has been known that the catalyst is also deactivated to the level insufficient for practical use in the presence of water vapor. These problems of the conventional catalysts urged the search for an improved catalyst which is active even in presence of water vapor.

As a solution to the above-mentioned problems, NOx reduction process using BEA zeolite ion-exchanged with Co (Co-BEA) as a catalyst is proposed in Italian Patent Application No. MI93A2337.

The Co-BEA catalyst is improved substantially in the activity and durability at low temperature in an actual exhaust gas atmosphere containing water vapor etc. However, even this catalyst does not provide high NOx conversion when the exhaust gas temperature is as low as 350° C., when NOx concentration in the exhaust is lower than about 100 ppm, or when the amount of effective hydrocarbons for NOx reduction is quite small in the exhaust. Therefore, a catalyst with higher activity and higher selectivity at low temperature and low NOx concentration has been sought for.

To meet the above-mentioned need, an object of the present invention is to provide a NOx reducing catalyst that is sufficiently active and durable at low temperature and low NOx and hydrocarbons concentrations even in exhaust gas containing water vapor and sulfur oxides (hereinafter referred to as SOx), etc., for use in reducing NOx in exhaust gases, such as those from natural gas combustion, which contain only small quantities of relatively lower hydrocarbons.

Another object of the invention is to provide a NOx reducing process using this catalyst.

DISCLOSURE OF INVENTION

Figure 1:
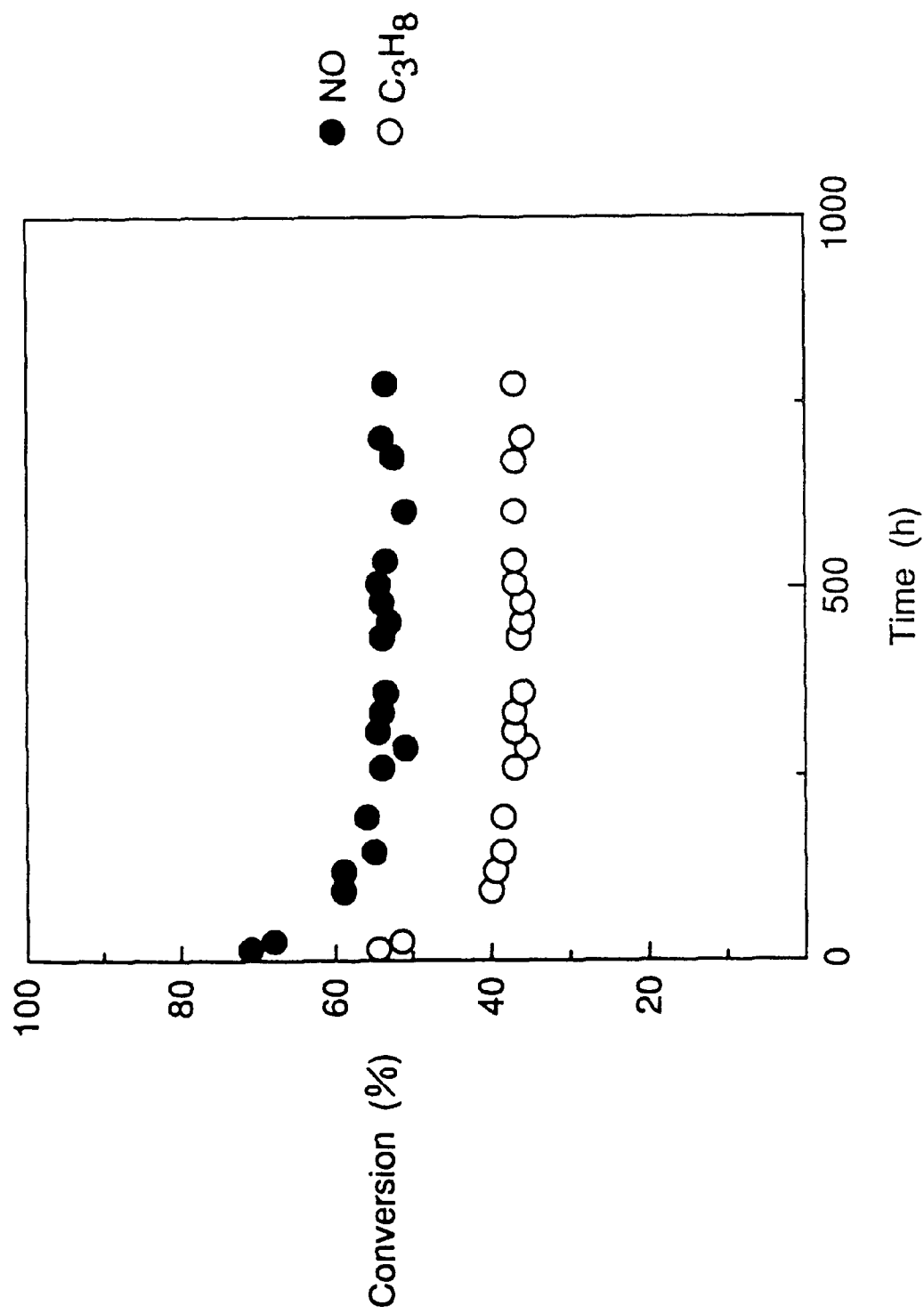
FIG. 1 shows the evaluation result for Ni-Co-BEA(1) catalyst.

To solve the above-mentioned problems, the inventors made substantial researches and found the following fact: when BEA zeolite is ion-exchanged with Co to have a Co/Al ratio (molar ratio; hereinafter, the same) between 0.2 and 0.6 and is loaded with at least one metal selected from among Ca, Sr, Ba, La, Mn, Ag and In, the oxidation activity of the resultant catalyst is enhanced moderately in a low temperature range without deteriorating the selectivity for NOx reduction, resulting in an increase in NOx reduction activity around 350° C.

The inventors also found that, when the loading metal is selected from among Ca, Sr, Ba and Mn, NOx adsorption on the catalyst is promoted, resulting in a substantial increase in NOx conversion even at a low NOx concentration.

Furthermore, the inventors found that, when BEA zeolite is ion-exchanged with Co and is loaded with Ni, the reaction for oxidizing hydrocarbons by oxygen is suppressed, resulting in substantially improved selectivity for NOx reduction.

The present invention has been made based on above findings. The catalyst according to this invention comprises BEA zeolite which is ion-exchanged with Co to have a Co/Al ratio between 0.2 and 0.6 and is loaded with at least one metal selected from among Ca, Sr, Ba, La, Mn, Ag, In, and Ni. The NOx reduction process according to the present invention comprises using this catalyst.

The catalyst of the present invention uses BEA zeolite, which may be manufactured by any conventional hydrothermal synthesis method using a template. An example of the synthesis method is disclosed in U.S. Pat. No. 3,308,069. To secure crystalline stability and ion exchange capacity for Co, the $SiO_2/Al_2O_3$ ratio (molar ratio; hereinafter, the same) of the BEA zeolite is preferably between 10 and 100. If the ratio is higher than 100, the resultant catalyst will be short of Co content, resulting in insufficient catalytic activity for selective reduction of NOx. If the ratio is lower than 10, it will be difficult to obtain high-purity crystals. In addition, Co loaded by ion exchange on the zeolite will aggregate, deteriorating the durability of the catalyst. To secure ion exchange with sufficient amount of Co as well as sustained Co dispersion, a more preferable $SiO_2/Al_2O_3$ ratio is between 15 and 50.

Part of Si and Al constituting the BEA zeolite framework may be substituted with Ti and B, respectively, as long as the altimate $SiO_2/Al_2O_3$ ratio is within the above-mentioned preferable range.

For the catalyst of the present invention, BEA zeolite is ion-exchanged with Co so that the Co/Al ratio becomes 0.2 to 0.6, and is further loaded with at least one metal selected from among Ca, Sr, Ba, La, Mn, Ag, In, and Ni. Either of the ion exchange with Co or the loading with a second metal may come first. They may be conducted simultaneously.

The second metal may be loaded by ion exchange, impregnation or any other method, although it is preferable to conduct impregnation after fixation of Co ions.

The ion exchange with Co may be performed by any ordinary method. For example, proton-, sodium- or ammonium-form BEA zeolite is suspended in an aqueous solution in a which water-soluble salt of Co, such as cobalt acetate or cobalt nitrate, is dissolved in a quantity equivalent to or somewhat larger than the ion exchange capacity. The zeolite is retained in the aqueous solution at a temperature between ambient temperature and about 80° C., allowing ion exchange with Co to take place for a duration of 1 hour to about 3 days. The resultant product is then washed with water, dried and calcined at 400 to 750° C. Since ion exchange takes place relatively easily on the BEA zeolite, it is preferable to use an aqueous solution of as low a concentration as possible and as low a temperature as possible for the ion exchange; such conditions allow metal ions to be loaded completely on ion-exchange sites with no aggregation. If Co loading is insufficient, the ion exchange operation may be repeated.

The zeolite may be loaded with a second metal through ion exchange in an aqueous solution of soluble salt of the second metal before or after ion exchange with Co. Alternatively, the zeolite may be ion-exchanged simultaneously with Co and a second metal in an aqueous solution of Co and the second metal. In either method, however, since Co ions loaded by ion exchange on the zeolite may be dissolved again, it is difficult to control the exchange amount of Co ions. Most preferably, therefore, ion exchange with Co is conducted first, followed by calcination to secure dispersion and fixation of Co ions in the BEA zeolite, then the Co-BEA zeolite is loaded with a second metal by impregnation. The second metal impregnation may be conducted by any ordinary method. For example, the ion-exchanged Co-BEA zeolite is suspended in an aqueous solution in which a specified quantity of a soluble salt, such as a nitrate or acetate, of a second metal is dissolved, and then water is evaporated. The Co-BEA zeolite may be formed to have a specified form as described below prior to the second metal impregnation. The final catalyst of the present invention is obtained by calcining the second-metal-loaded Co-BEA zeolite at 400 to 750° C.

It is necessary that the Co/Al ratio in the product catalyst is within the range between 0.2 and 0.6. If the ratio is lower than 0.2, catalyst activity will be insufficient. If the ratio is higher than 0.6, Co ions fill micropores in the zeolite, deactivating the catalyst. In addition, Co tends to aggregate, deteriorating catalyst durability.

The second metal loading is preferably within the range between 0.2 and 5 wt%, more preferably between 0.4 and 2 wt%, relative to catalyst weight without binder etc. If the second metal loading is less than 0.2 wt%, the second metal may not be effective. If the loading exceeds 5 wt%, the second metal ions will aggregate, clogging micropores in the zeolite, thus deteriorating the catalytic activity.

The catalyst of the present invention may contain a promoter or binder. The catalyst may be formed into pellet or honeycomb shape, or may be wash-coated on a refractory honeycomb support. The catalyst according to the present invention provides high activity and durability at low temperature in an actual exhaust gas atmosphere containing water vapor, due to the characteristics of Co-BEA zeolite. In addition, when the second metal is selected from among Ca, Sr, Ba, La, Mn, Ag, and In, the second metal enhances the oxidation activity to such an extent that does not impair the selectivity for NOx reduction, so that high NOx conversion is attained at still lower temperatures. Furthermore, when the second metal is selected from among Ca, Sr, Ba and Mn, it promotes NOx adsorption on the catalyst surface, thereby allowing catalytic reaction to occur efficiently even in an atmosphere at low NOx concentration. Therefore, high NOx conversion can be achieved even under conditions of low temperature and low NOx concentration. On the other hand, when Ni is used as the second metal, Ni added to the zeolite suppresses oxidation activity of the catalyst, lowering the reaction rate of simple combustion of hydrocarbon by oxygen. Consequently, the catalyst has improved selectivity for NOx reduction and therefore provides high NOx conversion even in exhaust gas containing small quantities of hydrocarbons.

The catalyst of the present invention may be loaded with two or more metals among these second metals, and in such a case, combined effects appear by different second metals. Even in this case, the loaded amount of the second metal is preferably 0.2 wt% or more for each metal, however, the total amount of the loaded second metals is preferably 5 wt% or less to avoid the clogging of the micropores by agglomerated second metals.

According to the NOx reduction process of the present invention, nitrogen oxides in exhaust gas containing hydrocarbons and an excessive amount of oxygen are selectively reduced, using hydrocarbons on a catalyst described above. That is, the process uses the catalyst comprising BEA zeolite which is ion-exchanged with Co to have a Co/Al ratio between 0.2 and 0.6, and is further loaded with at least one metal selected from among Ca, Sr, Ba, La, Mn, Ag, In and Ni.

According to the process of the present invention, NOx reduction is carried out by allowing the above-mentioned catalyst to contact exhaust gas containing NOx, hydrocarbons and an excessive amount of oxygen. The condition for this reduction process is not limited as long as the process uses a catalyst containing BEA zeolite which is ion-exchanged with Co to have a Co/Al ratio between 0.2 and 0.6, and is further loaded with at least one metal selected from among Ca, Sr, Ba, La, Mn, Ag, In and Ni. The operating temperature is between 300 and 600° C., preferably between 350 and 500° C., and the gaseous hourly space velocity (GHSV) is between 2,000 and 100,000, preferably between 5,000 and 30,000. Operating temperatures lower than 300° C. will result in insufficient catalytic activity, and that higher than 600° C. will cause early deterioration of the catalyst. The GHSV lower than 2,000 will result in high pressure loss, and that higher than 100,000 will result in poor NOx conversion.

Hydrocarbons mentioned in the present invention refer to a wide variety of hydrocarbons, including olefins such as ethylene, and paraffins such as propane. Preferably, they are aliphatic hydrocarbons having two to five carbons. Aromatic hydrocarbons are not preferable because the catalyst of the present invention has low activity for oxidizing hydrocarbons. Aliphatic hydrocarbons with about six or more carbons are not preferable either because they can hardly reach active sites deep in the micropores in the zeolite. It is difficult to obtain sufficient NOx conversion using methane due to its poor reactivity below 400° C.

The NOx reduction process of the present invention is not limited in the NOx concentration of exhaust gas. Hydrocarbon concentration in terms of methane (THC) required for NOx reduction is normally 1/2 to 10 times the NOx concentration. In other words, reduction of, for example, 10 to 5,000 ppm NOx requires 5 ppm to 5% hydrocarbons. If the hydrocarbon content in exhaust gas is not sufficient, an appropriate amount of hydrocarbons may be added to the exhaust gas to secure the desired NOx conversion.

The NOx reduction process of the present invention uses a catalyst based on BEA zeolite, which enables high reactant diffusion. This Co-BEA zeolite catalyst is loaded with a second metal which enhances the oxidation activity of the catalyst to such an extent that does not damage the selectivity for NOx reduction, when the second metal is selected from among Ca, Sr, Ba, La, Mn, Ag and In. Accordingly, with the process according to this invention, it is possible to attain high NOx conversion at a low temperature around 350° C. When the process uses Co-BEA catalyst loaded with a second metal selected from among Ca, Sr, Ba and Mn, NOx adsorption on the catalyst surface is promoted, so that catalytic reaction takes place efficiently even in an atmosphere at low NOx concentration. Therefore, high NOx conversion can be achieved under conditions of low temperature and low NOx concentration. On the other hand, when Ni is used as the second metal, high NOx conversion is attained even under the condition with low concentration of effective hydrocarbons, since the selectivity for NOx reduction is improved by Ni loading.

If the oxygen concentration in exhaust gas is too low, oxidation of nitrogen monoxide, which corresponds to the first stage of reaction, does not occur. The oxygen concentration is preferably 0.5% or higher, more preferably 3% or higher. The oxygen concentration has no upper limit. However, the oxygen concentration higher than that of air is not preferable because it may cause unexpected explosive combustion.

Exhaust gas may also contain other components, such as $H_2O$, $CO_2$, CO, $H_2$ and SOx. The NOx reduction process of the present invention is particularly suitable for use in exhaust gas containing substances, such as water and SOx, which are generally considered to hamper reaction for selective catalytic reduction with hydrocarbons. The process according to this invention is also suitable for reducing NOx in exhaust gas, such as those from natural gas combustion, in which 90% or more of hydrocarbons in terms of methane have four or smaller number of carbons. Since the NOx reduction process of the present invention uses hydrocarbons to reduce NOx, hydrocarbons in the exhaust gas are also removed, but CO is not removed. An oxidation catalyst may be provided downstream of the catalyst of the present invention, if necessary, to oxidize remaining CO, hydrocarbons, etc.

EXAMPLES

The present invention will be described in detail below with reference to the examples. These examples are not intended to limit the scope of the present invention.

Comparative Example 1

BEA zeolite with $SiO_2/Al_2O_3$ ratio of 22.3 was prepared by the process disclosed in U.S. Pat. No. 3,308,069. This BEA zeolite in an amount (Na form) in an amount of 250.14 g, was suspended in 2 liters of 0.2 M cobalt acetate, to perform ion exchange for 5 hours at 60° C. After filtration and washing with water, the same ion exchange operation was repeated. The resultant Co ion-exchanged zeolite was then washed with water, dried, and calcined for 12 hours in air at 550° C., to obtain Co-BEA(1) catalyst. The Co content of this catalyst was 3.0 wt%, and the Co/Al ratio was 0.40.

Comparative Example 2

BEA zeolite (Na form) with $SiO_2/Al_2O_3$ ratio of 16.3 was prepared by the process disclosed in U.S. Pat. No. 3,308,069. CO-BEA(2) catalyst was obtained from this zeolite by the same method as in Comparative Example 1, except that 15 g of zeolite was suspended in 70 ml aqueous solution of 0.2 M cobalt acetate, and calcined for 5 hours. The Co content of the resultant catalyst was 4.61 wt%, and the Co/Al ratio was 0.49.

Example 1

Ten grams of Co-BEA(1) catalyst obtained in Comparative Example 1 was added to 18 ml aqueous solution prepared by dissolving 313 mg lanthanum nitrate $(La(NO_3)_3 \cdot 6H_2O)$ in water. The solution was dried at 120° C. for 18 hours while being stirred occasionally, and was calcined for 5 hours in air at 550° C., to give La-Co-BEA catalyst. The La content of the resultant catalyst was 0.93 wt%, and the Co/Al ratio was 0.41.

Example 2

Ag-CO-BEA catalyst was obtained by the same method as in Example 1, except that 10 g of Co-BEA(1) catalyst was added to 18 ml aqueous solution prepared by dissolving 158 mg silver nitrate $(AgNO_3)$ in water. The Ag content of the resultant catalyst was 0.87 wt%, and the Co/Al ratio was 0.41.

Example 3

In-Co-BEA catalyst was obtained by the same method as in Example 1, except that 10 g of Co-BEA(1) catalyst was added to 18 ml aqueous solution prepared by dissolving 355.7 mg indium nitrate $(In(NO_3)_3)$ in water. The In content of the resultant catalyst was 1.39 wt%, and the Co/Al ratio was 0.40.

Example 4

Ca-Co-BEA catalyst was obtained by the same method as in Example 1, except that 10 g of Co-BEA(1) catalyst was added to 18 ml aqueous solution prepared by dissolving 612 mg calcium nitrate $(Ca(NO_3)_2 \cdot 4H_2O)$ in water. The Ca content of the resultant catalyst was 1.01 wt%, and the Co/Al ratio was 0.40.

Example 5

Sr-Co-BEA (1) catalyst was obtained by the same method as in Example 1, except that 10 g of Co-BEA(1) catalyst was added to 18 ml aqueous solution prepared by dissolving 253 mg strontium nitrate $(Sr(NO_3)_2)$ in water. The Sr content of the resultant catalyst was 0.96 wt%, and the Co/Al ratio was 0.40.

Example 6

Ba-Co-BEA catalyst was obtained by the same method as in Example 1, except that 10 g of Co-BEA(1) catalyst was added to 18 ml aqueous solution prepared by dissolving 196.7 mg barium nitrate $(Ba(NO_3)_2)$ in water. The Ba content of the resultant catalyst was 0.99 wt%, and the Co/Al ratio was 0.40.

Example 7

Mn-Co-BEA catalyst was obtained by the same method as in Example 1, except that 10 g of Co-BEA(1) catalyst was added to 18 ml aqueous solution prepared by dissolving 461.1 mg manganese acetate $(Mn(CH_3COO)_2 \cdot 4H_2O)$ in water. The Mn content of the resultant catalyst was 0.98 wt%, and the Co/Al ratio was 0.39.

Example 8

CO-BEA(1) catalyst (10.4674 g) obtained in Comparative Example 1 was added to 400 ml aqueous solution prepared by dissolving 369.3 mg strontium nitrate $(Sr(NO_3)_2)$ in water, and stirred for 4 hours at 50° C. to perform ion exchange with Sr. The resultant solid was filtrated, washed with water, dried, and calcined in air at 550° C., to give Sr-Co-BEA (2) catalyst. The Sr content of this catalyst was 0.98 wt%, and the Co/Al ratio was 0.3.

Example 9

Ni-CO-BEA(1) catalyst was obtained by the same method as in Example 1, except that 10 g of Co-BEA(1) catalyst was added to 18 ml aqueous solution prepared by dissolving 389.7 mg nickel nitrate $(Ni(NO_3)_2 \cdot 6H_2O)$ in water. The Ni content of the resultant catalyst was 0.68 wt%, and the Co/Al ratio was 0.41.

Example 10

Ni-CO-BEA(2) catalyst was obtained by the same method as in Example 1, except that 6 g of Co-BEA(2) catalyst was added to 10 ml aqueous solution prepared by dissolving 333.3 mg nickel nitrate in water. The Ni content of the resultant catalyst was 1.20 wt%, and the Co/Al ratio was 0.49.

Comparative Example 3

MFI (ZSM-5) zeolite (ammonium form) with $SiO_2/Al_2O_3$ ratio of 50 was prepared according to the process disclosed in British Patent No. 1,402,981. Thirty grams of this zeolite was suspended in 3 liters of aqueous solution of 0.00582 M cobalt acetate, and stirred for 10 hours at 90° C., to perform ion exchange. After filtration and washing with water, the same ion exchange operation was repeated three times. The resultant Co ion-exchanged zeolite was then washed with water, dried, and calcined for 5 hours in air at 500° C., to give Co-MFI catalyst.

From 6 g of Co-MFI catalyst thus prepared, Ag-Co-MFI catalyst was obtained by the same method as in Example 2, except that the zeolite was added to 10 ml aqueous solution prepared by dissolving 92.8 mg silver acetate ($CH_3COOAg$) in water, followed by evaporation of water at 80° C. The Ag content of the resultant catalyst was 0.99 wt%, and the Co/Al ratio was 0.53.

Comparative Example 4

Sr-Co-MFI catalyst was obtained by the same method as in Comparative Example 3, except that 6 g of Co-MFI catalyst of Comparative Example 3 was added to 10 ml aqueous solution prepared by dissolving 147 mg strontium acetate ($Sr(CH_3COO)_2.0.5H_2O$) in water. The Sr content of the resultant catalyst was 1.01 wt%, and the Co/Al ratio was 0.53.

Comparative Example 5

Mn-Co-MFI catalyst was obtained by the same method as in Comparative Example 3, except that 6 g of Co-MFI catalyst of Comparative Example 3 was added to 10 ml aqueous solution prepared by dissolving 267.7 mg manganese acetate ($Mn(CH_3COO)_2.4H_2O$) in water. The Mn content of the resultant catalyst was 1.05 wt%, and the Co/Al ratio was 0.53.

Comparative Example 6

In-Co-MFI catalyst was obtained by the same method as in Comparative Example 3, except that 6 g of Co-MFI catalyst of Comparative Example 3 was added to 10 ml aqueous solution prepared by dissolving 185.4 mg indium acetate ($In(NO_3)_3.3H_2O$) in water. The In content of the resultant catalyst was 1.03 wt%, and the Co/Al ratio was 0.53.

Comparative Example 7

Ni-Co-MFI catalyst was obtained by the same method as in Comparative Example 3, except that 6 g of Co-MFI catalyst of Comparative Example 3 was added to 10 ml aqueous solution prepared by dissolving 254.4 mg nickel acetate ($Ni(CH3COO)_2-4H_2O$) in water. The Ni content of the resultant catalyst was 1.05 wt %, the Co content was 1.9 wt %, and the Co/Al ratio was 0.53.

Example 11

Each of the catalysts obtained in Examples 1 through 10 and Comparative Examples 1 through 7 was formed into pellets, which were crushed and sieved to give 1 to 2 mm particles. The particles were then calcined for 9 hours in air at 500° C. to prepare a sample. A stainless steel reaction tube (14 mm in inner diameter) was packed with 4 ml of this sample. Test gas of the composition given in Table 1 (Condition 1) was allowed to flow through this reaction tube at 1 liter/min (GHSV=15,000), and gas composition at the outlet of the reaction tube was measured by a chemiluminescence NOx meter and a gas chromatograph. The same measurement was made using test gas of the same composition as given in Table 1 except that NO=150 ppm and $C_3H_8$=500 ppm (Condition 2), and using test gas of the same composition as given in Table 1 except that NO=150 ppm and $C_3H_8$=250 ppm (Condition 3).

TABLE 1

| | |
|---|---|
| NO = 500 ppm | $H_2$ = 660 ppm |
| $C_3H_8$ = 1000 ppm | $CO_2$ = 6% |
| $O_2$ = 10% | $H_2$ = 9% |
| CO = 1000 ppm | He balance |

Table 2 gives the catalytic activity (NOx and propane conversions) of each catalyst. The NOx and propane conversions were calculated from the NOx and propane concentrations measured at the inlet and outlet of the reaction tube, using the following equations:

TABLE 2

$$\text{NOx Conv. (\%)} = \frac{\text{Outlet } N_2 \text{ Conc. (ppm)} \times 2}{\text{Inlet NO Conc. (ppm)}} \times 100$$

$$C_3H_8 \text{ Conv. (\%)} = \frac{\text{Inlet } C_3H_8 - \text{Outlet } C_3H_8 \text{ Conc. (ppm)}}{\text{Inlet } C_3H_8 \text{ Conc. (ppm)}} \times 100$$

| Condition | Catalyst | NOx Conversion ($C_3H_8$ Conversion) (%) | | | |
|---|---|---|---|---|---|
| | | 350° C. | 400° C. | 450° C. | 500° C. |
| 1 | Co—BEA(1) | 56.3(57.2) | 83.7(94.7) | 89.6(97.9) | 86.0(99.8) |
| | La—Co—BEA | 76.4(92.4) | 89.6(97.7) | 85.8(99.7) | 71.8(100) |
| | Ag—Co—BEA | 86.4(88.6) | 89.4(98.1) | 71.7(100) | 60.3(100) |
| | In—Co—BEA | 79.0(92.0) | 86.1(94.9) | 82.0(99.1) | 67.4(100) |
| | Sr—Co—BEA(2) | 75.0(96.6) | 89.9(98.1) | 87.4(99.6) | 73.7(100) |
| | Ni—Co—BEA(1) | 85.6(73.0) | 92.0(85.3) | 89.4(97.9) | 76.2(99.8) |
| | Co—BEA(2) | | 64.8(99.0) | | 33.9(100) |
| | Ni—Co—BEA(2) | 94.5(90.0) | 95.6(97.2) | 89.7(99.8) | 75.7(100) |
| | Ag—Co—MFI | 45.2(29.7) | 74.7(86.5) | 71.4(98.4) | 59.6(100) |
| | In—Co—MFI | 50.3(66.4) | 64.7(81.3) | 62.5(100) | 56.4(100) |
| | Ni—Co—MFI | 11.7(9.2) | 46.9(52.9) | 56.8(82.0) | 51.4(93.1) |
| 2 | Co—BEA(1) | 34.8(60.1) | 69.5(78.7) | 70.8(84.6) | 74.5(97.0) |
| | Ca—Co—BEA | 73.0(89.8) | 84.0(96.2) | 79.0(100) | 63.3(100) |
| | Sr—Co—BEA(1) | 71.2(96.6) | 83.9(98.4) | 77.1(99.6) | 54.3(100) |
| | Ba—Co—BEA | 71.7(92.4) | 81.9(96.4) | 76.8(98.8) | 61.8(100) |
| | Sr—Co—BEA(2) | 78.0(86.2) | 81.0(83.8) | 80.2(96.4) | 69.9(100) |
| | Mn—Co—BEA | 77.0(82.0) | 84.4(95.4) | 78.5(99.4) | 63.7(100) |
| | Ni—Co—BEA(1) | 59.6(57.9) | 64.9(65.6) | 66.2(83.4) | 60.9(96.0) |
| | Co—BEA(2) | 32.8(88.9) | 71.0(98.7) | | |
| | Ni—Co—BEA(2) | 88.2(81.4) | 89.1(97.6) | 79.2(100) | 61.9(100) |
| | Sr—Co—MFI | 34.7(83.6) | 57.8(98.4) | 61.3(79.3) | 52.6(100) |
| | Mn—Co—MFI | 17.9(40.6) | 38.7(91.8) | 36.5(100) | 30.0(100) |
| 3 | Ni—Co—BEA(2) | 69.7(78.8) | 75.2(98.4) | 63.1(100) | |

As is shown in Table 2, the La-, Ag- and In-Co-BEA catalysts of the present invention provide higher NOx conversion than the corresponding Co-BEA(1) catalyst in a low temperature range from 350 to 400° C. As is also shown in this Table, the Ca-, Sr-, Ba- and Mn-Co-BEA catalysts of the present invention provide high NOx conversion in a temperature range from 350 to 450° C. under Condition 2 with low NOx concentration. With these catalysts, NOx adsorption on the catalyst surface is promoted, so that high NOx conversion can be achieved even at low NOx concentration. Furthermore, the Ni-Co-BEA(1) and Ni-Co-BEA(2) catalysts of the present invention provide higher NOx conversion than the corresponding Co-BEA(1) and Co-BEA(2) catalysts in a low temperature range from 350 to 400° C.

In addition, under Condition 2 with low NOx and $C_3H_8$ concentrations, the catalyst of the present invention provides lower $C_3H_8$ conversion and higher NOx conversion due to Ni loading; Ni enhances the selectivity for NOx reduction in a low temperature range.

Meanwhile, Co-MFI based catalysts are less active than Co-BEA based ones even if they are loaded with Ag, In, Sr, Mn, Ni or other second metal, because of the low activity and selectivity of Co-MFI zeolite.

Comparative Example 8

BEA zeolite (Na form) with $SiO_2/Al_2O_3$ ratio of 17.5 was prepared according to the process disclosed in U.S. Pat. No. 3,308,069. Co-BEA(3) catalyst was obtained from this zeolite by the same method as in Comparative Example 1, except that 150 g of zeolite was suspended in 2 liter aqueous solution prepared by dissolving 150 g cobalt acetate (Co $(CH_3COO)_2.4H_2O$) in water, and repeated the ion exchange procedure three times. The Co content of the resultant catalyst was 4.59 wt %, and the Co/Al ratio was 0.51.

Example 12

Ni-Co-BEA(3) catalyst was obtained by the same method as in Example 1, except that 10 g of Co-BEA(3) catalyst was added to an aqueous solution prepared dissolving 216 mg nickel acetate ($Ni(CH_3COO)_2.4H_2O$) in water. The Ni content of the resultant catalyst was 0.483 wt %, and the Co/Al ratio was 0.52.

Example 13

Ni-Co-BEA(4) catalyst was obtained by the same method as in Example 1, except that 50 g of Co-BEA(3) catalyst was added to an aqueous solution pepared by dissolving 2.164 g nickel acetate in water. The Ni content of the resultant catalyst was 0.95 wt %, and the Co/Al ratio was 0.51.

Example 14

Ni-Co-BEA(5) catalyst was obtained by the same method as in Example 1, except that 10 g of Co-BEA(3) catalyst was added to an aqueous solution prepared by dissolving 874.3 mg nickel acetate in water. The Ni content of the resultant catalyst was 1.87 wt %, and the Co/Al ratio was 0.51.

Example 15

In-Ni-Co-BEA catalyst was obtained by the same method as in Example 1, except that 10 g of Ni-Co-BEA(4) catalyst was added to an aqueous solution prepared by dissolving 134.2 mg indium nitrate in water. The Ni content of the resultant catalyst was 0.97 wt %, the In content was 0.49 wt %, and the Co/Al ratio was 0.52.

Example 16

NOx reduction activity of each of the catalysts obtained in Examples 12 through 15 and Comparative Examples 8 was measured in the same way as in Example 11. The test gas composition was the condition 2. The results are shown in Table 3.

TABLE 3

| Condition | Catalyst | NOx Conversion | ($C_3H_8$ Conversion) (%) | | |
|---|---|---|---|---|---|
| | | 350° C. | 400° C. | 450° C. | 500° C. |
| 2 | Co-BEA(3) | 50.2(90.2) | 79.3(99.2) | 86.0(99.6) | 78.4(100) |
| | Ni-Co-BEA(3) | 61.5(72.2) | 89.7(90.6) | 90.2(93.0) | 82.5(99.0) |
| | Ni-Co-BEA(4) | 60.5(54.4) | 88.9(85.6) | 88.3(97.4) | 76.4(100) |
| | Ni-Co-BEA(5) | 49.9(33.4) | 85.1(66.0) | 88.3(91.2) | 79.3(99.4) |
| | In-Ni-Co-BEA | 62.4(63.8) | 90.1(88.0) | 90.4(94.8) | 80.9(100) |

As is shown in Table 3, the Ni-Co-BEA(3) through (5) catalysts of the present invention provide higher NOx reduction selectivity than the corresponding Co-BEA(1) catalyst at around 400° C. However, on Ni-Co-BEA(5), which contained large amount of Ni, NOx conversion at 350° C. is almost same as that on Co-BEA(3), suggesting that NOx conversion might decrease at a low temperature under these reaction conditions if Ni is loaded much more than Ni-Co-BEA(5). On the other hand, on In-Ni-Co-BEA, obtained by loading In on Ni-Co-BEA(4), the catalytic activity at low temperatures is increased compared to Ni-Co-BEA(4), showing the combined effects of Ni and Co.

Example 17

Durability of Co-BEA(1) catalyst obtained in Comparative Example 1 and of Ni-Co-BEA(1) catalyst obtained in Example 9 was evaluated by the same method as in Example 11, except that the test gas of the composition given in Table 4, simulating exhaust gas of a lean-burn natural gas engine, was allowed to flow continuously (GHSV=15,000) through the reaction tube at 400° C.

TABLE 4

| | |
|---|---|
| NO = 150 ppm | $H_2$ = 250 ppm |
| $C_3H_8$ = 500 ppm | $CO_2$ = 6% |
| $O_2$ = 10% | $H_2O$ = 9% |
| $CH_4$ = 1000 ppm | $SO_2$ = 0.3 ppm |
| CO = 500 ppm | He balance |

FIG. 1 shows the evaluation result for Ni-Co-BEA(1) catalyst. Co-BEA(1) catalyst stopped deteriorating and stabilized in activity after hundreds of hours in the evaluation test, and shows 50% $C_3H_8$ conversion and 44% NOx conversion after 500 hours. By contrast, Ni-Co-BEA(1) catalyst maintains 50% or higher NOx conversion for the period of 1,000 hours; obviously, NOx conversion exceeds $C_3H_8$ conversion due to Ni loading. Thus, the catalyst according to the present invention provides not only high initial catalytic activity but also high selectivity for NOx reduction and high durability in the presence of water vapor, SOx etc.

Example 18

Ni-Co-BEA(6) catalyst was obtained by the same method as in Example 1, except that 110 g of Co-BEA(3) catalyst was added to 200 ml of aqueous solution prepared by dissolving 4.7789 g nickel acetate in water and dried at 100° C. The Ni content of the resultant catalyst was 1.04 wt %, and the Co/Al ratio was 0.51.

Figure 2:
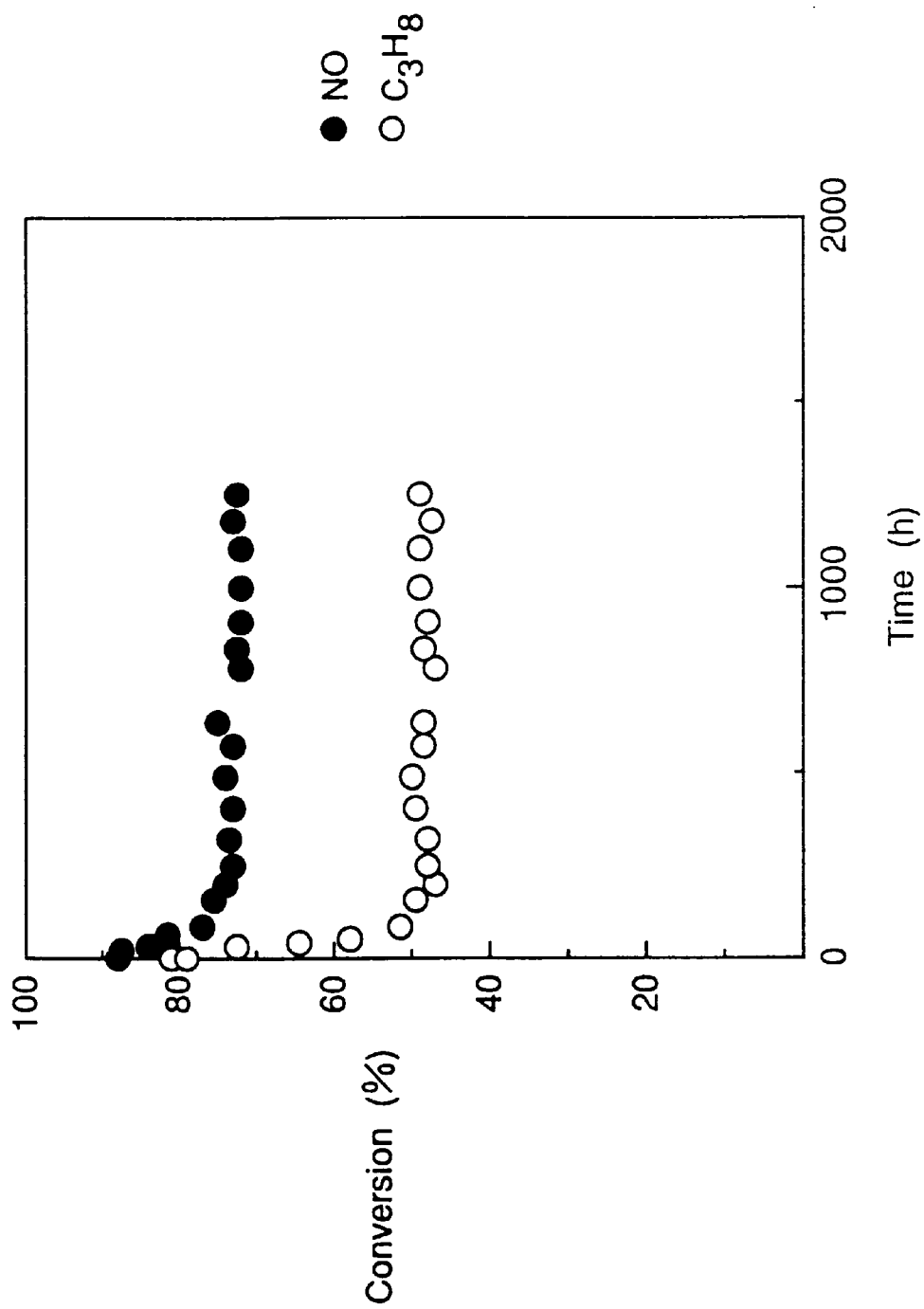
FIG. 2 shows the result of durability test for the Ni-Co-BEA(6) catalyst.

FIG. 2 shows the result of durability test for the obtained Ni-Co-BEA(6) catalyst in the same way as in Example 17. Although the tendency of the change with time is similar to FIG. 1, the stabilized NOx conversion is more than 70%: higher than in FIG. 1. That is, even in the case of Ni-Co-BEA(6), on which higher NOx conversion is observed due to larger amount of exchanged Co ion enabled by lower $SiO_2/Al_2O_3$ ratio of BEA zeolite than Ni-Co-BEA(1), high NOx reduction selectivity and durability in the presence of water vapor, SOx etc., are obtained by Ni addition.

EFFECT OF THE INVENTION

As described above, the catalyst according to the present invention is based on Co-BEA, which has high activity and durability at low temperature in an actual exhaust gas atmosphere containing water vapor and other substances obstructive to catalytic reaction. When the second metal is selected from among Ca, Sr, Ba, La, Mn, Ag and In, since the second metal added to the catalyst promotes the oxidation activity moderately without impairing the catalytic selectivity for NOx reduction, high NOx conversion is attained at even lower temperature. When the second metal is selected from among Ca, Sr, Ba and Mn, NOx adsorption on the catalyst is promoted, so that the catalyst provides high NOx conversion at low temperature, even at low NOx concentration. When Ni is added, since the catalyst of the present invention provides improved selectivity for NOx reduction due to Ni loading, it attains high NOx conversion in an actual exhaust containing obstructive substances, such as water vapor and SOx, even under the condition with low concentration of effective hydrocarbons.

We claim:

1. A catalyst useful for reducing nitrogen oxides by hydrocarbons in an oxygen-rich combustion exhaust, comprising BEA zeolite which is ion-exchanged with Co to have a Co/Al ratio between 0.2 and 0.6 and loaded with at least one metal selected from among Ca, Sr, Ba, La, Mn, Ag, In and Ni.

2. The catalyst according to claim 1, wherein the BEA zeolite which is first ion-exchanged with Co and subsequently is loaded by impregnation with at least one metal selected from among Ca, Sr, Ba, La, Mn, Ag, In and Ni.

3. The catalyst according to claim 2, wherein the amount of the impregnated metal is 0.2 to 5 wt %.

4. The catalyst according to claim 3, wherein the metal loaded after ion exchange with Co is Ni and the amount of Ni is 0.4 to 2 wt %.

5. The catalyst according to claim 1 wherein the BEA zeolite has an $SiO_2/Al_2O_3$ ratio between 10 and 100.

6. The catalyst according to claim 5, wherein the $SiO_2/Al_2O_3$ ratio is within the range between 15 and 50.

7. A catalyst useful for reducing nitrogen oxides by hydrocarbons in an oxygen-rich combustion exhaust, comprising BEA zeolite which is ion-exchanged with Co to have a Co/Al ratio between 0.2 and 0.6 and loaded with at least one metal selected from among Ca, Sr, Ba and Mn.

8. A catalyst useful for reducing nitrogen oxides by hydrocarbons in an oxygen-rich combustion exhaust, comprising BEA zeolite which is ion-exchanged with Co to have a Co/Al ratio between 0.2 and 0.6 and loaded with Ni.

9. A catalyst useful for reducing nitrogen oxides by hydrocarbons in an oxygen-rich combustion exhaust, comprising BEA zeolite having an $SiO_2/Al_2O_3$ ratio between 10 and 100 which is ion-exchanged with Co to have a Co/Al ratio between 0.2 and 0.6 and loaded with at least one metal selected from among Ca, Sr, Ba, La, Mn, Ag, In and Ni at an amount of 0.2 to 5 wt %.

10. The catalyst according to claim 9, wherein the $SiO_2/Al_2O_3$ ratio is within the range between 15 and 50.

11. The process according to claim 10, wherein the combustion exhaust contains at least about 9% by volume of water vapor.

12. A process for reducing nitrogen oxides in combustion exhaust, which contains hydrocarbons, an excessive amount of oxygen and water vapor, by means of hydrocarbons having at least two carbon atoms, comprising contacting the combustion exhaust with a catalyst containing BEA zeolite which is ion-exchanged with Co to have a Co/Al ratio between 0.2 and 0.6 and loaded with at least one metal selected from among Ca, Sr, Ba, La, Mn, Ag, In and Ni so as to reduce nitrogen oxides in the exhaust gas.

13. The process according to claim 12, wherein the catalyst comprises BEA zeolite with an $SiO_2/Al_2O_3$ ratio between 10 and 100 which is first ion-exchanged with Co and subsequently loaded by impregnation with at least one metal selected from among Ca, Sr, Ba, La, Mn, Ag, In and Ni in an amount of 0.2 to 5 wt %.

14. The process according to claim 13, wherein 90% or more of hydrocarbons, calculated on the basis of carbon atoms contained in the combustion exhaust have no more than four carbon atoms.

15. The process according to claim 14, wherein the combustion exhaust contains at least about 9% by volume of water vapor.

16. The process according to claim 13, wherein the $SiO_2/Al_2O_3$ ratio is within the range between 15 and 50.

17. The process according to claim 13, wherein the combustion exhaust contains at least about 9% by volume of water vapor.

18. The process according to claim 12, wherein the combustion exhaust contains at least about 9% by volume of water vapor.

* * * * *